Aug. 9, 1966  J. W. GRAY  3,265,869
ANALOG PREDICTION COMPUTER
Filed Aug. 3, 1962  4 Sheets-Sheet 1

INVENTOR.
JOHN W. GRAY
BY *H. S. Mackey*
ATTORNEY

INVENTOR.
JOHN W. GRAY
BY
ATTORNEY

INVENTOR.
JOHN W. GRAY
BY
ATTORNEY

Aug. 9, 1966  J. W. GRAY  3,265,869
ANALOG PREDICTION COMPUTER

Filed Aug. 3, 1962  4 Sheets-Sheet 4

*INVENTOR.*
JOHN W. GRAY

BY *H. A. Mackey*

ATTORNEY

United States Patent Office 3,265,869
Patented August 9, 1966

3,265,869
ANALOG PREDICTION COMPUTER
John W. Gray, Pleasantville, N.Y., assignor to General Precision, Inc., a corporation of Delaware
Filed Aug. 3, 1962, Ser. No. 214,566
8 Claims. (Cl. 235—150.23)

This invention relates to general-purpose direct-current analog computers and particularly to such computers used for predicting the relative courses of moving objects. The objects may be of any kind, such as marine vessels, aircraft, or space vehicles.

To illustrate the use of the invention, an embodiment to help prevent collisions at sea is chosen. In this embodiment the computer is carried by a marine surface vessel and continuously surveys the positions of other, nearby surface vessels. The computer depicts ships' positions, including that of its own ship, by spots of light displayed on a screen. The computer continuously moves these spots of light to maintain correct representation of the relative positions of the vessels. This reportorial mode of action of the computer is prefatory to its prediction mode of operation.

In the prediction mode the computer, starting with positions and velocities of the spots on the screen corresponding to present positions and velocities of the ships, continues to move the spots in their several directions but with greatly accelerated velocities, so that paths which would be traversed by the ships in the ensuing 15 minutes, for example, are simulated by the movement of the spots on the screen in five seconds.

As this accelerated action occurs, the observer can note any conjunction of a target spot with his own ship's spot. This conjunction would forewarn of a collision, and the observer could then, by means outside of the scope of this invention, take steps to avoid it.

The invention provides facilities for maneuvering any of the spots during the prediction phase of action of the computer. This is done by course and speed knobs, which set changes into the course of the spot representing the ship. These facilities are provided so that, when a collision has been predicted, the observer can try a change of course or speed on the screen to be sure the collision will be successfully avoided before ordering the same change of course or speed of his ship.

Warning is provided not only of an impending collision, but also of any impending near collision. This warning provision consists of an illuminated concentric circle which can be placed around any selected spot on the screen representing the observer's own ship or any target ship. This ring has an adjustable, calibrated radius so that in the event of a close approach of two spots of light their separation at their closest point of approach can be measured by application of a ring of known and adjustable radius around one of the spots. Thus a visual, manually-operated measurement of the positions of closest approach is secured when the observer's own ship and another ship are on converging courses.

An automatic warning circuit is provided for use when the computer is unattended. It continuously monitors the distances between the computer's ship and each of the other ships during the computer's forecasting cycle. If any other ship approaches the computer's ship closer than a selected distance an alarm is given. This alarm is for the purpose of alerting the operator, who then can observe the visual display and judge whether a change in course or speed of his ship is required.

The same automatic warning circuit may be employed for other purposes by providing it with inputs representing relative present ship positions instead of the forecast future positions. The circuit output signals then constitute proximity signals and can be used either to avoid imminent collision by manual action, as in the marine example above, or, if incorporated in a missile, for example, can be used for automatic homing of the missile on its target.

The computer of this invention requires procurement from a tracking radar and other sources of signal inputs representing the orthogonal components of own ship position, of each target ship position relative to own ship and the orthogonal components of their velocities. The computer of this invention contains inverting amplifiers, together with resistors and capacitors to perform integration, storage of signals, summation, inversion, and other functions. Programmers including timers are provided to repeatedly "act out" the anticipated future events at a greatly speeded-up rate. Controls are provided for speeding up, slowing down, or freezing the prophetic enactment of travel paths. Other controls are provided for initiating right or left turns and speed changes, in combination or singly, of any target ship or of the observer's ownship. Provision can be made for simultaneous computations of the future paths of as many target ships as desired. Outputs are displayed as moving spots of light on the screen of a cathode ray tube similar to the plan position indicator used in radar sets.

One purpose of the present invention is to predict the paths which two objects will take and to display these paths.

Another purpose is to represent, by spots in a scaled representation moving in real time, the current motions of two objects.

Still another purpose is to represent, by spots in a scaled representation moving in computer time faster than real time, the future motions of two objects starting from instant positions.

Still another purpose is to represent, by the controlled maneuvers of one or both of two spots in a scaled representation moving in computer time faster than real time and starting from instant positions of represented objects, the future motions and relative positions of the two objects with a view to observing or securing signals representative of their positions of closest approach.

Further understanding of this invention may be secured from the detailed description and associated drawings, in which:

FIGURE 1 is a block diagram of components for carrying out the invention.

FIGURES 2 and 3 taken together compose a schematic circuit diagram of several components combined to form part of an embodiment of the invention.

Figure 1:
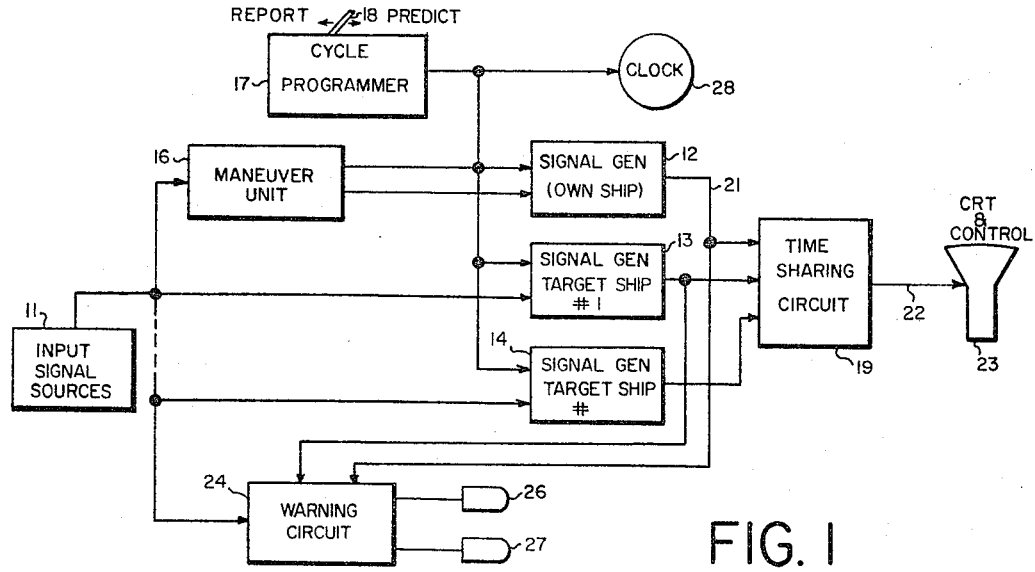

Referring now to FIGURE 1, block 11 represents the sources of signals applied to an embodiment of the invention for use in preventing collisions of marine surface vessels. This block 11 may represent the tracking apparatus referred to supra. The computer of this embodiment is carried by a ship which also carries radar equipment by which all ships within radar range, for example 20 miles, are kept under continuous observation. By means of a tracker, signals are derived from the radar receptions which represent the positions and velocities of all target ships. In the most general case two signals, $x$ and $y$, will be furnished by the tracker for each target ship representing its orthogonal coordinates of position relative to the tracking ship and two other signals, $\dot{x}$ and $\dot{y}$, representing its orthogonal coordinates of velocity relative to the tracking ship. In a less general case the tracker furnishes velocity coordinates of targets relative to a fixed frame instead of relative to the tracking ship. These coordinates are termed $\dot{x}_f$ and $\dot{y}_f$, and have the following relations to the relative coordinates:

$$\dot{x}_f = \dot{x} + \dot{x}_0 \qquad (1)$$
$$\dot{y}_f = \dot{y} + \dot{y}_0 \qquad (2)$$

in which $\dot{x}_0$ and $\dot{y}_0$ are the orthogonal coordinates of velocity of the tracking ship relative to a fixed coordinate frame.

In the most general case, in which signal inputs to the computer $x$, $y$, $\dot{x}$ and $\dot{y}$ are furnished representing relative quantities for each target, the computer must also be furnished with two other signals representing course ($C_0$) and speed ($V_0$) of own ship so that the relative target signals can be converted into absolute target signals.

A number of signal generators are represented by the blocks 12, 13 and 14. A separate signal generator is provided for the vessel carrying the computer, or "own ship," and one for each target ship which it is desired to survey. Each target signal generator is given signals representing the orthogonal coordinates of relative position and orthogonal coordinates of velocity of its target. Each generator emits two signals representing the orthogonal coordinates of absolute position of the target.

Any or all of the signal generator inputs can be modified by a maneuver unit so that, in the prediction mode, the target signal output can represent a ship which is turning or changing speed. Such a maneuver unit 16, is connected into the input circuits of own ship's signal generator 12.

A cycle programmer 17 is provided for manual transfer of the computer from the reporting mode of operation to the prediction mode and vice versa. Movements of the handle 18 effect these transfers. The programmer also contains units for automatic timing of operations in the prediction mode.

All signal generator outputs are time shared by a suitable switch 19, which may consist of a mechanical commutator or of an equivalent electronic switch. All coordinate signal conductor pairs, such as represented at 21, for example, are connected by the commutating unit successively to its output pair 22.

The commutating unit output conductors 22 are connected to the two deflection terminals of a cathode ray tube which, with its control and power supply circuits, is indicated at 23. The fluorescent screen of this tube should be of the medium persistence type.

A warning circuit is indicated by the block 24, with separate displays consisting of two warning lamps 26 and 27. This warning circuit is given inputs consisting of own ship position signals and the position signal outputs of one signal generator. Each target ship channel requires its own separate warning circuit.

A clock 28 has its input controlled by the cycle programmer 17, so that during operation of the computer in its prediction mode the clock tells time in computer time. In the report mode the clock is inoperative.

*Signal generator and maneuver units*

Figure 2:
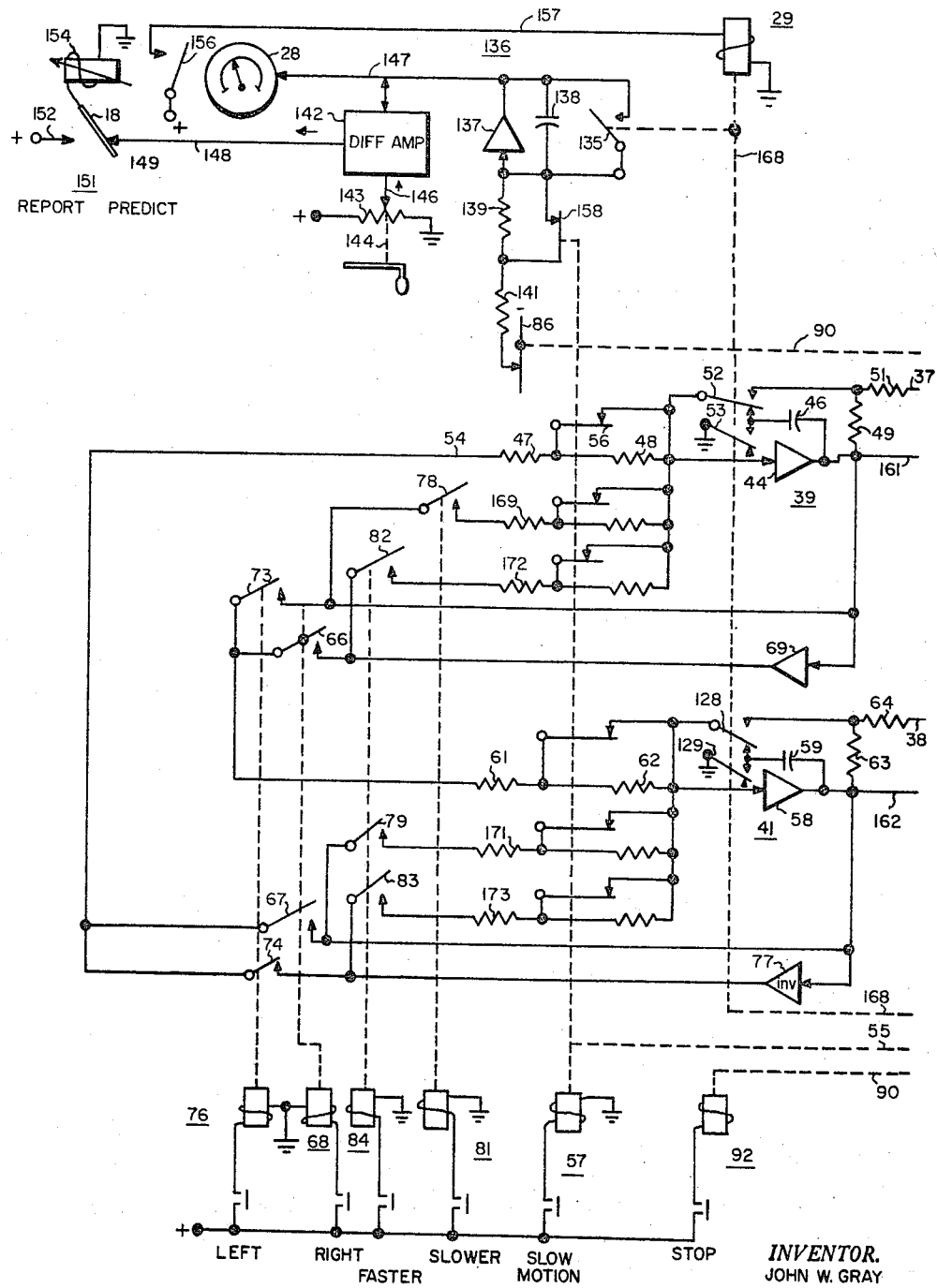
Figure 3:
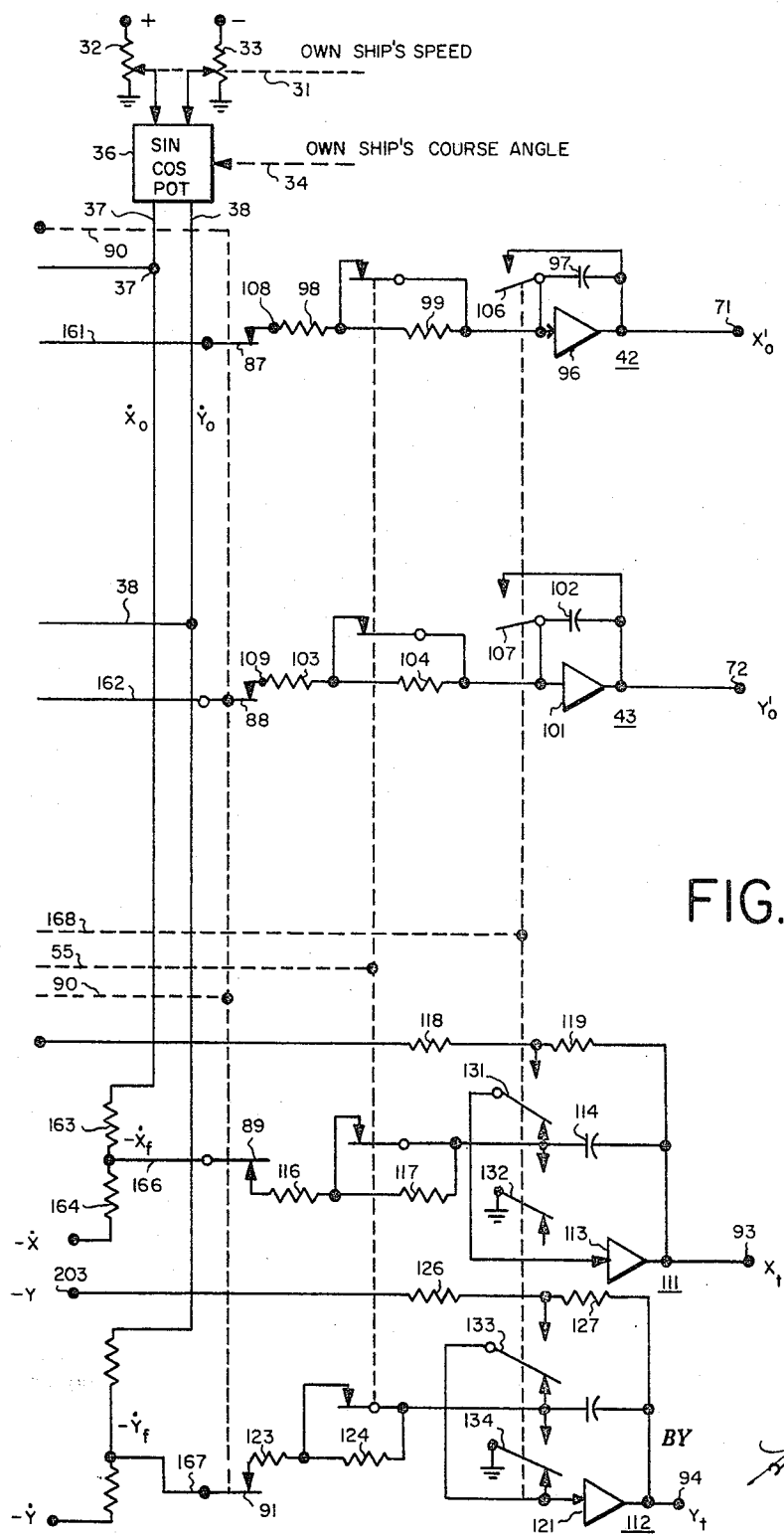

FIGURES 2 and 3 contain the schematic circuit of the own ship signal generator 12, FIGURE 1, the circuit of one target signal generator such as generator 13, and all of the maneuver unit circuits, block 16, shown connected to the own ship signal generator for simulating own ship maneuvers.

It is to be understood that, although only one target signal generator circuit is shown in FIGURES 2 and 3, this component may be duplicated to permit as many target spots to be displayed as there are target ships. For example, ten such target signal generator circuits might be provided. It is also to be understood, that although only one set of maneuver circuits is shown, connected to maneuver own ship's spot, these circuits might be duplicated for any or all of the target ships.

The circuit diagram also contains the clock 28, essential elements of the cycle programmer 17, FIGURE 1, a mode control relay 29, and several other relays. Relay 29 switches the circuit between the report and the prediction modes. Its contacts are shown in the prediction mode positions. The other relays are for the purpose of setting various maneuvers into the own ship presentation during the prediction mode, and are drawn with their contacts in their non-maneuver positions. All of the amplifiers indicated in the schematic circuit have high gain, are direct-coupled and inverting.

Own ship speed from a pitometer log is received as the deflection of a shaft 31 which positions two linear potentiometers 32 and 33. The ship's course angle relative to true or magnetic north is received as the deflection of a shaft 34 which positions a sine-cosine potentiometer 36 receiving excitation from the potentiometers 32 and 33. The output direct-current potentials to ground on conductors 37 and 38 are representative of East-West velocity, $\dot{x}_0$, and North-South velocity, $\dot{y}_0$, respectively, of the computer's own ship.

The maneuver integrators 39 and 41 have the functions of integration and storage of signals for delivery to the own ship position integrators 42 and 43. Circuit 39 includes inverting amplifier 44, capacitor 46, and resistors 47, 48, 49 and 51. In the prediction mode with the position of relay contacts 52 and 53 as shown, the circuit is an integrator, with its input consisting of whatever potential may be applied through conductor 54 to resistor 47. Resistor 48 is short circuited by a contact 56 of relay 57 in the normal prediction mode. When the contact 56 is opened the operation of the integrating circuit is slowed to, for example, one-fifth of its normal speed. The relay 57 has a number of contacts having a similar function, these contacts operating in concert as indicated by the dashed line 55. Circuit 41 is similar to circuit 39, and includes inverting amplifier 58, capacitor 59, and resistors 61, 62, 63 and 64.

The contacts 66 and 67 of relay 68, when operated, join integrating circuits 39 and 41 in series with an inverting amplifier 69 in a closed ring which causes the output potentials, $\dot{x}_0$ and $\dot{y}_0$, on terminals 71 and 72, to simulate a right turn of the computer's own ship. Similarly, the contacts 73 and 74 of relay 76, when operated, join integrating circuits 39 and 41 in series in a ring with a second inverting amplifier 77 to generate signals at terminals 71 and 72 simulating a left turn.

Contacts 78 and 79 of a relay 81, when operated, short-circuit the input and output of their respective integrating circuits 39 and 41, causing the output signals at terminals 71 and 72 to simulate a ship which is slowing down. Contacts 82 and 83 of a relay 84, when operated, short-circuit the input and output of their respective integrating circuits 39 and 41 through the respective inverters, 69 and 77, simulating at terminals 71 and 72 a speed acceleration lasting as long as the relay contacts are closed. Contacts 86, 87, 88, 89 and 91 of relay 92, when operated during the prediction mode and in concert as indicated by the dashed line 90, cause computer time to stand still by stopping the clock and making the potentials unvarying at the output terminals 71, 72, 93 and 94.

The own ship position integrators 42 and 43 integrate own ship velocity coordinates to own ship position coordinates relative to a fixed coordinate frame. Integrator 42 consists of inverting amplifier 96, capacitor 97 and resistors 98 and 99. Integrator 43 consists of inverting amplifier 101, capacitor 102 and resistors 103 and 104. In the report mode the integrator outputs are always zero because the contacts 106 and 107 are closed, short-circuiting output to input. In the prediction mode the output potentials at terminals 71 and 72 represent the integrals of the input potentials applied to the resistor input terminals 108 and 109. Thus, when the input potentials are zero, the outputs are constant, when the input potentials are positive, the output potentials decrease, and when the input potentials are negative, the output potentials increase.

The target ship position integrators 111 and 112 are similar but not identical to the integrators 42 and 43. Integrator 111 consists of inverting amplifier 113, capacitor 114 and resistors 116, 117, 118 and 119. Integrator 112 consists of inverting amplifier 121, capacitor 122, and resistors 123, 124, 126 and 127. In the report mode the integrators 111 and 112 operate as inverters. They also store output signal potentials in their capacitors. In the prediction mode these integrators integrate and convert target velocity to target position relative to a fixed reference.

The mode relay 29 has a pair of contacts 135 inserted in the clock circuit, two pairs of contacts 52 and 53, and 128 and 129, in each of the integrating circuits 39 and 41, a pair of contacts, 106 and 107, in each of the own ship's position integrators 42 and 43, and two pairs of contacts 131, 132, 133 and 134 in each of the target position integrators 111 and 112. All of these contacts are connected to the several integrating capacitors and, in the relay position shown, permit their circuits to act as integrators. In the opposite relay position these contacts either short-circuit the capacitor or ground its input side. In circuits 39, 41, 111 and 112 these contacts additionally operate to connect the associated amplifier to operate as an inverter.

The clock circuit 136 is basically an integrator consisting of an inverting amplifier 137, a capacitor 138, and two resistors 139 and 141. The integrator is associated with the relay 29 and contacts 135 to form a sawtooth cycle generator, the sawtooth slope being dependent on the resistance-capacitance product. The sawtooth termination is controlled by a differential amplifier 142 which controls the operation of the relay 29. The differential amplifier 142 operating point is in turn controlled by a potentiometer 143 adjustable by a manual control 144. The clock face 28 contains a single hand sweeping over a 270° arc divided into 45 parts and marked as 45 minutes of time. The clock mechanism is that of an ordinary voltmeter, and the clock indication is linearly proportional to the voltage impressed on its voltmeter circuit by the conductor 147. The magnitude of this voltage is such that when it is increasing during the few seconds of the prediction mode, the clock time may advance many minutes. The differential amplifier output conductor 148 is connected to a fixed contact 149 of a manual start-stop switch 151. The other fixed contact 152 is connected to a fixed potential terminal and the switch arm 18 is connected to a fast-operate, slow-release relay 154 having its release delay adjustable. The normally open relay contacts 156 are connected to a fixed potential source and through conductor 157 to the winding of the mode control relay 29.

Operation of the mode control relay and associated circuits in the report mode is as follows. The manual switch 151 is set to "report." Power thus applied to relay 154 closes its contacts, operating relay 29. Its contacts close, including contacts 135, short circuiting capacitor 138. The output of amplifier 137 is held at zero potential allowing the hand of the clock 28 to remain against its zero stop.

Operation of these circuits in the prediction mode is as follows. The manual switch 151 is set to "predict." The differential amplifier is so designed that when it has a large input differential voltage it has a small or zero output voltage, and when it has a small input voltage it has a large output voltage. In this case, at the instant of starting the prediction mode the voltage on conductor 147 is zero so that, since there is voltage at input 146, the differential input is large and the output at conductor 148 is small or zero. Therefore relay 154 is released, releasing relay 29. This removes the short circuit from capacitor 138 and it, together with amplifier 137 constituting an integrator, produces increasing potential on conductor 147. This potential causes the clock face 28 to indicate accelerated or computer time and its hands to move 180 times as fast as they would if indicating real time. When the voltage of conductor 147 becomes equal to that derived from potentiometer 143, the differential amplifier output in conductor 148 operates relay 154, operating relay 29 and short-circuiting the capacitor 138 and the integrator. The potential in conductor 147 falls to zero, returning the hand of clock 28 to zero. The potential in conductor 148 falls to zero but relay 154 delays release for two seconds. This causes a "reset" hiatus of two seconds during which the entire circuit operates in the report mode. At the end of two seconds relay 154 releases and the time cycle again commences.

Thus a five-second computer time period alternates with a two-second real time period as long as the switch 151 is in the "predict" position. The ratio of real time to computer time is proportional to the integrator 136 RC product, and the duration in seconds of the prediction period is controlled by this product and the setting of the slider shaft 144. Opening of the relay contacts 158 increases the RC product five times, increasing the prediction period from five seconds to twenty-five seconds. Opening of the relay contacts 86 reduces the integrator input to zero and, if it occurs during the computer time or prediction period, "freezes" all operations until the contacts are closed, when all operations resume.

In the operation of the computer as shown in FIGURES 2 and 3, let it be assumed that signals representing own ship's speed and course angle are received, and that the switch 151 is in the "report" position, putting the computer in its report mode of operation. Relay 29 is therefore operated and all of its contacts, including contacts 52 and 53, are in the positions opposite to those shown in FIGURES 2 and 3. Capacitor 46 is grounded at one terminal and at the other is connected to the output conductor 161 of amplifier 44. This amplifier is shunted by the resistor 49 and in this mode operates as an inverter. Its input being $\dot{x}_0$, its output in conductor 161 represents $-\dot{x}_0$. The voltage representing this quantity is also applied to charge capacitor 46 and this charge varies, up or down, as $-\dot{x}_0$ varies.

Figure 4:
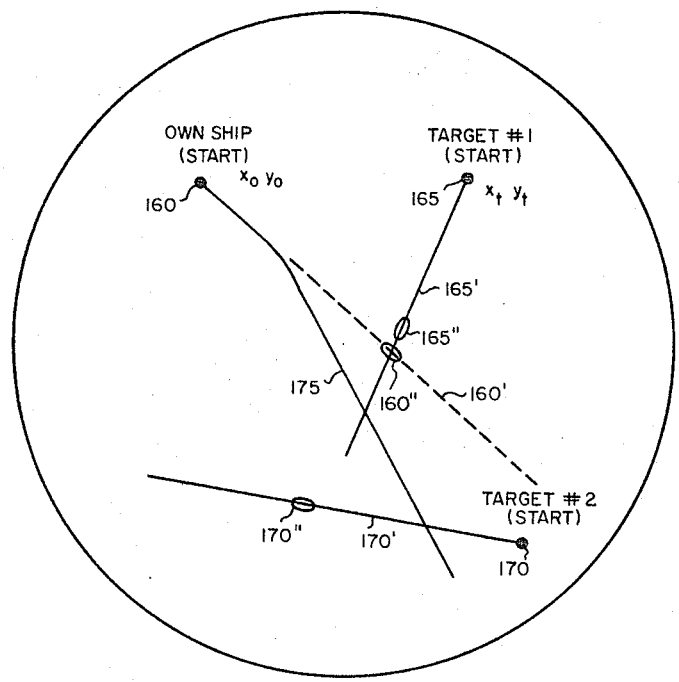
FIGURE 4 is a view of the face of the cathode ray tube exhibiting system outputs.

Since relay 29 is operated, switch 106 located in the circuit of the position integrator 42 is closed, short-circuiting the input to output of the inverting amplifier 96. In any inverting amplifier thus short circuited, when the output is given a potential, say negative, it causes the input to become negative but this potential, inverted in passing through the amplifier, neutralizes the given output potential, reducing it to zero. Thus the output potential is held rigidly to zero output at all times by the action of the amplifier. This output is termed $x'_0$ and represents the East-West coordinate of the own ship spot on the screen of the cathode ray tube 23, FIGURE 1. This screen is shown in FIGURE 4 with the starting locations of own ship shown as 160, target #1 as 165 and target #2 as 170. The symbol is primed to distinguish from $x_0$, defined as the real time East-West coordinate of own ship position. In the report mode $x'_0 = x_0$, but in the prediction mode they will have different values.

Similarly, the signal $-\dot{y}_0$ appears on conductor 162 and the signal $y'_0$ at terminal 72 has zero potential.

In the cathode ray tube 23, FIGURE 1, the $x=0$, $y=0$ position of the spot is, of course, the tube face coordinate frame origin, and is normally at the center of the screen. By means of the usual manual controls this point can be shifted to any other point of the screen, as convenient. This point, wherever positioned, always represents the real time location of own ship and is the depicted position in the report mode of operation.

In the report mode of operation the target position circuit contacts 131, 132, 133 and 134 are in positions opposite to those shown. The amplifiers 113 and 121 are therefore connected as inverters. The input to amplifier 113 consists of the signal $-x$, representing the negative of the signal representing the $x$-coordinate of the target ship relative to own ship. This signal, $-x$, is inverted by the inverting amplifier to become the output, $x_t = x$, at terminal 93. Similarly the output $y_t = y$ appears at terminal 94. These outputs are necessarily different from zero since the position of the target ship is different from that of own ship. They are impressed through the commutator circuit 19, FIGURE 1, on the cathode ray tube screen to produce a target ship spot offset from the coordinate origin by amounts $x_t$, $y_t$, as shown in FIGURE 4 by the spot 165. In FIGURE 3 these coordinate voltage magnitudes are also impressed on the grounded capacitors 114 and 122.

The signal $\dot{x}_0$ on conductor 37 is algebraically added in resistors 163 and 164 to the signal $-\dot{x}$, resulting in the fixed coordinate frame signal $-\dot{x}_f$, in accordance with equation (1), in conductor 166. Since one end of resistor 117 is grounded, this signal is not used in the report mode. Similarly, the signal $-\dot{y}_f$ exists on conductor 167 but is not used.

Operation of the computer in the prediction mode is initially described without considering any maneuvers, so that the predicted courses of both own ship and target ship are in a straight line and at constant speed. The relays 76, 68, 84, 81, 57 and 92 remain unoperated. Transfer is made from the report mode to the prediction mode by moving the switch 151 to the "predict" position. This releases relay 29, placing all of its contacts joined by the dashed line 168 in the positions shown in FIGURES 2 and 3. The six circuits 39, 41, 42, 43, 111 and 112 are thereby switched to become integrator circuits.

In circuit 39, the input potential is zero and the charge existing on capacitor 46 at the instant of switching, representing $-\dot{x}_0$, the fixed frame of reference East-West speed of own ship, becomes and remains the output of the integrator 39.

This becomes the input to integrator 42 the output of which, $x'_0$, starting at zero, changes in proportion to the integral of the input rate, the rate of position change depending on both the input and the RC product of integrator 42. Similarly, the output $y'_0$ at terminal 72 begins to change. These voltage changes occurring at terminals 71 and 72 and applied to the cathode ray tube, cause the spot on the cathode ray tube screen representing own ship to move at a high rate away from its initial position at the coordinate origin point. This movement persists during the computer time period of the prediction cycle, say, for five seconds, after which relay 29 again short circuits both amplifiers 96 and 101 returning them for two seconds to the real time period of the prediction cycle, during which the outputs are identical with outputs in the report mode.

At the starting instant of the prediction mode, circuits 111 and 112 are converted to integrators and, in circuit 111, the input $-\dot{x}_f$ applied to conductor 166 becomes the integrator input. As this is the fixed frame target ship velocity its integral, $x_t$, is the fixed frame target ship position. It changes rapidly in accordance with the integrator RC product and under control of the constant integrator input quantity. The input $-x$ at terminals 165 has no effect because of the relatively high resistances of resistors 118 and 119. The behavior of circuit 112 is similar.

Thus during the five-second period of computer time in the prediction mode the two terminals 93 and 94 apply rapidly changing voltages to the cathode ray tube, causing its target ship spot to move rapidly from its initial position $x_t y_t$ in the direction of its velocity vector and with a speed equal to 180 times the speed of its real-time velocity vector. At the end of the five-second period the spot jumps back to its current real-time position, remains for two seconds, then repeats the cycle under control of relay 29. This is shown in FIGURE 4 by the dashed line 160' for own ship and the solid line 165' for the target ship. If there should be another target ship 170, its course might be indicated on the screen by the line 170'.

At the instant when the path 160' intersects the projected target path 165', depending on the several ship speeds, the positions of the three ships could be as indicated by the spots 160'', 165'' and 170''. It is obvious that the closeness of the spots 160'' and 165'' indicate a predicted near collision. In such a case a course change should be set into the own ship course and/or the target ship course, or a change in speed of either or both.

In order to observe relative ship courses when a change-of-course prediction is set into the predicted own ship's path, the switching arrangements of relays 68 and 76 are provided. Relay 68, when operated, causes the own ship output to simulate a right turn having a rate of turn controlled by the values of resistance of resistors 47 and 61 as parts of the RC products of circuits 39 and 41. When relay 68 is operated it closes contacts 66 and 67, placing circuit 41 including resistor 61 in series with circuit 39, including resistor 47, and inverter 69, in a closed ring in that order. It has been shown by V. Bush and S. Caldwell and described in "A New Type of Differential Analyzer," published in the Journal of the Franklin Institute, 240, Oct. 4, 1945, that such a circuit constitutes a sine generator. The output of this circuit, a sinusoidally changing potential, is available at conductors 161 and 162, and superimposes changing potentials on the fixed potential inputs of integrator circuits 42 and 43. Their outputs therefore no longer change linearly, and together as $x'_0$ and $y'_0$ produce a circularly curved spot locus on the cathode ray tube screen. This new course is indicated in FIGURE 4 by the solid line 175, which successfully avoids the target ship and eliminates the danger of collision.

Refinements may be added, such as timing circuits to delay start of the curve and to terminate the curved part of the predicted ship path after a selected time or after a selected number of degrees of turn.

When relay 76 is operated instead of relay 68, circuit 41 is placed in series with inverter 77 and circuit 39, in a closed ring in that order. This results in simulation of a left turn.

An exponential deceleration of own ship speed is simulated by operatnig relay 81. This closes a loop extending from the output of the integrator 39 through resistor 169, to its input, causing an exponential reduction of potential at conductor 161 at a rate controlled by the size of resistor 169. Similarly, the input and output of circuit 41 are connected through resistor 171. Thus, as the input voltages to circuits 42 and 43 decrease, the rates of change of their output voltages $x'_0$ and $y'_0$ become smaller, betokening slowing of own ship speed.

An increase of own ship speed is similarly secured. This increase may be linear, exponential, or a combination, as may best simulate behavior of a ship under consideration. As an example, exponentially decreasing speed increase is selected. To accelerate own ship speed, relay 84 is operated. This connects the input to the output of integrator 39 through a resistor 172 and the inverting amplifier 69. It also connects the input to the output of integrator 41 through a resistor 173 and the inverting amplifier 77. These circuit changes cause increasing potentials at conductors 161 and 162 but at exponentially decreasing rates, causing corresponding voltage increases at terminals 71 and 72 and corresponding simulated own ship speed increases on the cathode ray tube screen.

In order to produce slower motion during the prediction period of both own and target ship in order to observe their relative motions more clearly, relay 57 is provided. Operation of this relay inserts additional resistance in each of the four position integrator circuits. In addition it inserts resistance in all maneuver circuits so that all simulated motions on the screen of the two ships' spots are reduced in exact proportion. Insertion of these resistors increases all RC products in proportion, increasing the integrating time constants proportionally and slowing down output voltage changes correspondingly.

This causes the spots on the screen to move more slowly.

The relay 92 is provided to stop all motions of the two spots on the screen during the prediction period. This action extends to the clock circuit, thus enabling the spots to be "frozen" for many seconds. Relay 92 opens the inputs of the four position integrators and of the clock integrator, causing the integrator output voltages to become constant and two spots stationary.

*Circle generator*

Figure 5:
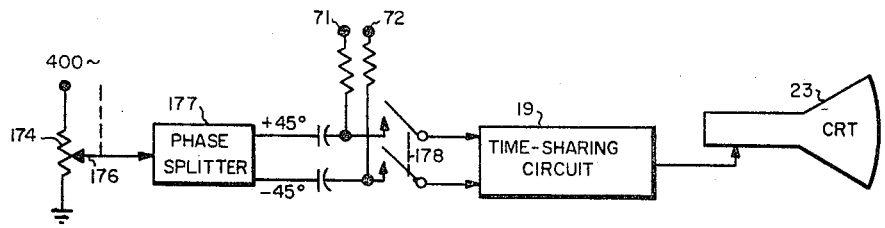
FIGURE 5 is a schematic diagram of a circuit for applying a ring around a spot indicating a ship's position on a display screen.

FIGURE 5 shows a simple arrangement for placing a circle around the own ship spot on the screen. It is to be understood that such a circuit may be applied, also, to the circuits of any target ship or ships. A potentiometer 174 has a slider 176 applying 400 c.p.s. potential to a phase splitter 177. The outputs, 90 degrees apart, are mixed with the direct potentials representing the signals $x'_0$ and $y'_0$ taken from terminals 71 and 72, and through a control switch 178 are applied to the commutating or time-sharing circuit 19. The output is applied to the deflection circuits of the cathode ray tube 23.

In the operation of this circuit the direct voltages representing $x'_0$ and $y'_0$ but containing small amounts of out-of-phase alternating current, are applied to the cathode ray tube $x$ and $y$ axis inputs so that a circle of light is described around the point $x'_0, y'_0$. The circle radius is controlled by the position of manually-operated slider 176, which may be calibrated in miles or yards or indeed any other units of linear measurement.

*Warning circuit*

Figure 6:
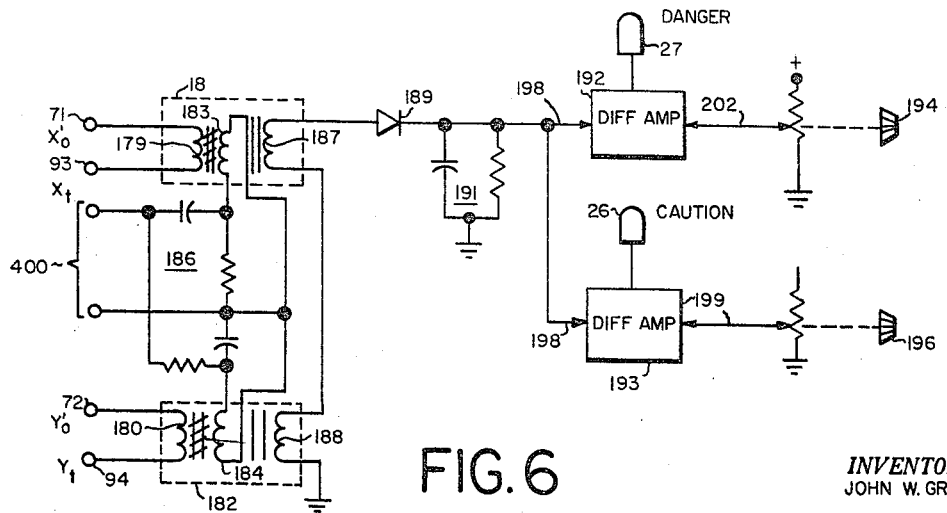
FIGURE 6 is a schematic of an automatic circuit for warning of the approach of a ship to another ship.

FIGURE 6 shows a circuit which can be used instead of the cathode ray tube, or in addition to it. This circuit emits a warning or other signal when the target ship approaches to a selected distance from one's own ship. It is to be understood that, although this circuit is applied to own ship and a single target ship, additional identical circuits can be employed simultaneously to warn of the proximity of any of them to one's own ship. The figure shows the circuit arranged to give two signals, termed caution and danger signals, at two different selected and adjustable distances.

Two inputs are taken from the terminals 71 and 72, FIGURES 3 and 6, representing fixed frame own ship coordinates, and two other inputs are taken from terminals 93 and 94 representing fixed-frame target ship coordinates. They are connected to the ends of control windings 179 and 180 of two magnetic modulators, 181 and 182, so that effectively the differences, representing target ship coordinates relative to own ship, are impressed on the control windings 179 and 180. The power input primary windings 183 and 184 are supplied with 400 c.p.s. inputs in phase quadrature by the phase splitting circuit 186. In the output windings 187 and 188, then, appear quadrature voltages proportional in magnitude to the relative target coordinates $x$ and $y$. By connecting windings 187 and 188 in series, the series current constitutes the vector sum of the currents in each of the windings, and therefore represents the linear distance between the two ships. This alternating current is rectified to a proportional direct current in a diode 189 and smoothed in a smoothing circuit 191. It is then applied to the inputs of two differential amplifiers 192 and 193. By means of potentials, adjusted by knobs 194 and 196 calibrated in yards or other units of measure, applied to these amplifiers, lamp 26 is made to light when the potential applied through conductor 198 to differential amplifier 193 equals that applied through conductor 199, representing approach of the two ships to the distance selected by knob 196. Lamp 27 is made to light when the potential applied through conductor 198 to differential amplifier 192 equals that applied through conductor 202, representing approach of the two ships to the second, lesser, distance selected by knob 194.

In the operation of this warning circuit, the mode relay 29, FIGURE 2, is released, so that its contacts are in the positions shown and operation is in the prediction mode. Then, during each five-second computer time period of the prediction cycle, if the two ships are predicted by the computer to approach as close as the first selected distance, lamp 26 will light momentarily, lighting momentarily again during each prediction cycle as long as the predicted proximity situation continues. If the two ships are predicted to approach more closely, to the second selected distance, lamp 27 will light in addition to lamp 26.

Thus fifteen minutes warning is given of an impending dangerous approach of another ship to one's own ship. By changing circuit constants the warning time can be increased, or decreased, from fifteen minutes to thirty minutes or to any other value.

The proximity warning circuit of FIGURE 6 can be made to operate in real time instead of prediction mode or computer time by employing as inputs to the windings 179 and 180 the $-x$ and $-y$ target ship inputs from terminals 165 and 203, FIGURE 3. This circuit would then perform the function of a proximity device.

What is claimed is:
1. A prediction computer comprising,
a first signal converter having signals representative of the velocity of a first object impressed thereon,
a second signal converter having signals representative of the position and velocity of a second object impressed thereon,
display means having the outputs of said first and second signal converters imposed thereon and providing a visual display of relative positions of said first and second objects,
and relay means connected to said first and second signal converters for selectively placing said signal converters in a report mode and a prediction mode of operation, said relay means including means in said first converter operative in the report mode for reducing the output signals of said first converter to zero and operative in the prediction mode for converting said first signal converter to a pair of integrators, said relay means further including means in said second signal converter operative in the report mode for converting said second signal converter to a pair of signal inverters and operative in the prediction mode for converting said second signal converter to a pair of integrators.

2. A prediction computer in accordance with claim 1 including a plurality of signal converters for reporting and predicting the paths of a plurality of objects relative to said first object.

3. A prediction computer on a marine ship comprising,
means generating signals representing coordinates of velocity of said ship and generating signals representing coordinates of position and of velocity of a marine target,
a ship position signal generator including a first pair of integrators, said first pair of integrators receiving said ship velocity signals and generating ship's position signals representing coordinates of ship's position relative to a fixed coordinate frame,
a target position signal generator including a second pair of integrators, said second pair of integrators receiving said target position and target velocity signals and generating target position signals representing coordinates of target position relative to a fixed coordinate frame,
cathode ray tube presentation means including a fluorescent screen having an origin for displaying light spots having positions relative to said origin representing absolute positions of said ship and target relative to a fixed frame of reference,
means applying signal outputs of said ship and target position signal generators to said presentation means,
mode switching means connected to said ship and target position signal generators for switching between report and prediction modes, means in said mode switching means for switching, in the report mode, to connect the input terminal to the output terminal of each of said first pair of integrators whereby the output signals thereof have zero magnitude and ship light spot is accordingly at screen origin, means in said mode switching means for switching, in the prediction mode, said first pair of integrators to cause them to integrate said applied velocity signals to become position signals causing said ship light spot to move with a speed representing a selected multiple of said ship velocity speed component, means in said mode switching means for converting, in report mode, said second pair of integrators to a pair of inverters causing the output signals thereof to equal the inverted position input signals, and means in said mode switching means for connecting, in prediction mode, said second pair of integrators to integrate said target velocity input signals to target position output signals causing said target light spot to move with a speed representing said selected multiple of the target velocity speed component.

4. A prediction computer in accordance with claim 3 including a turn generator for simulating, in the prediction mode, right and left ship turns comprising, a third pair of integrators, an inverter in series therewith to form a closed loop circuit, means applying coordinates of ship velocity to said third pair of integrators as initial constants of integration, a connection from each output of said third pair of integrators to a respective input of said first pair of integrators, whereby said closed loop circuit becomes a sine generator, and switch means transposing the input and output of said inverter to change from right to left turn generation.

5. A prediction computer in accordance with claim 3 including an acceleration generator for simulating increase of ship speed in the prediction mode comprising, first and second integrators, an inverter connecting each integrator output to its input in a closed loop circuit, means applying signals representative of coordinates of ship velocity to said first and second integrators respectively as initial constants of integration, and a connection from each output of said first and second integrators to a respective input of said first pair of integrators whereby said closed loop circuits generate exponentially increasing potentials.

6. A prediction computer in accordance with claim 3 including a deceleration generator for simulating decrease of ship speed in the prediction mode comprising, first and second integrators, a resistor connecting each integrator output to its input in a closed loop circuit, means applying signals representative of coordinates of ship velocity of said first and second integrators respectively as initial constants of integration, and a connection from each output of said first and second integrators to a respective input of said first pair of integrators whereby said closed loop circuits generate exponentially decreasing potentials.

7. A prediction computer in accordance with claim 3 including a ring generator comprising, a phase splitter emitting two alternating potentials at 90 degrees relative phase difference, means adding to said alternating potentials the ship position signal generator output signals representing coordinates of ship position, and means applying the sum signals to said cathode ray tube whereby a circle is displayed concentric with said ship spot on the screen.

8. A prediction computer in accordance with claim 3 including a warning circuit comprising, a pair of modulators, means applying two alternating potentials at 90 degrees relative phase displacement respectively to said pair of modulators, means applying output signals of said ship position signal generator and of said target position signal generator to said modulators, means adding the outputs of said modulators to form an alternating signal proportional to the distance between said ship and said target, means converting said alternating signal to a direct current signal, and means operating a warning signal when said direct current signal magnitude becomes less than a selected amount representing approach of said ship to said target to less than a selected distance in either the prediction or report mode.

References Cited by the Examiner

UNITED STATES PATENTS 3,137,849 6/1964 Moxley _____ 343—10

MALCOLM A. MORRISON, *Primary Examiner.*

K. W. DOBYNS, *Assistant Examiner.*